(12) United States Patent
Beki

(10) Patent No.: US 7,387,313 B2
(45) Date of Patent: Jun. 17, 2008

(54) ROLLOVER PROTECTION SYSTEM WITH A FOLDING ROLL BAR FOR VEHICLES

(75) Inventor: Gürkan Beki, Engelskirchen (DE)

(73) Assignee: ISE Innomotive Systems Europe GmbH, Bergneustadt (DE)

( * ) Notice: Subject to any disclaimer, the term of this patent is extended or adjusted under 35 U.S.C. 154(b) by 0 days.

(21) Appl. No.: 11/591,235

(22) Filed: Nov. 1, 2006

(65) Prior Publication Data

US 2007/0138780 A1  Jun. 21, 2007

(30) Foreign Application Priority Data

Dec. 15, 2005  (DE) .................. 10 2005 059 910

(51) Int. Cl.
 *B60R 21/13* (2006.01)
(52) U.S. Cl. .................. 280/756; 297/113; 297/115
(58) Field of Classification Search ................ 280/748, 280/756; 297/113, 115
See application file for complete search history.

(56) References Cited

U.S. PATENT DOCUMENTS

| 5,393,093 | A | * | 2/1995 | Wunsche et al. ........... 280/756 |
| 5,779,272 | A | * | 7/1998 | Panek et al. ................ 280/756 |
| 5,941,330 | A | * | 8/1999 | Miller et al. .............. 180/89.15 |
| 5,971,434 | A | * | 10/1999 | Neufeld et al. ............. 280/756 |
| 5,984,408 | A | * | 11/1999 | Bujaryn ...................... 297/323 |
| 6,126,227 | A | * | 10/2000 | Bitelli .................... 296/107.03 |
| 6,557,893 | B2 | * | 5/2003 | Sauermann ................. 280/748 |
| 6,752,422 | B2 | * | 6/2004 | Sauermann ................. 280/748 |
| 6,860,707 | B2 | * | 3/2005 | Roan et al. ................. 414/723 |
| 2006/0001248 | A1 | * | 1/2006 | Queveau et al. ............ 280/756 |
| 2006/0017271 | A1 | * | 1/2006 | Muller et al. ............... 280/756 |

FOREIGN PATENT DOCUMENTS

| DE | 37 32 562 | 11/1988 |
| DE | 39 25 513 | 2/1991 |
| DE | 196 04 423 | 8/1997 |
| DE | 100 40 642 | 9/2001 |

(Continued)

OTHER PUBLICATIONS

Automotive Engineering, *Tech Briefs*, Warrendale, PA, US, Bd. 98, No. 12, Dec. 1990, pp. 55-56, 59, 60, 61-63, XP000204655.

*Primary Examiner*—Toan To
(74) *Attorney, Agent, or Firm*—Hudak, Shunk & Farine Co. LPA

(57) ABSTRACT

A rollover protection system for vehicles with roll bars allocated to the vehicle seats, which roll bars are guided into a holder, which holder is fixed to the vehicle, and under normal conditions the roll bar is held by a holding device in a lower, stored position, is controlled by a sensor, and upon release of the holding device, is brought into an upright, protective position. In order to design a rollover protection system, allocated to the seat, with a roll bar body in the form of a folding roll bar, each roll bar comprises two frame pieces each spaced along the vehicular lateral axis having one pivotably connected end in mountings, which mountings are located in a bracket fixed to the vehicle, and with the free ends so connected that when folded, they slide against each other, and when deployed, they interlock against each other.

18 Claims, 4 Drawing Sheets

FOREIGN PATENT DOCUMENTS

| | | |
|---|---|---|
| DE | 101 43 934 | 6/2002 |
| DE | 600 01 224 | 1/2003 |
| EP | 0233 777 | 5/1993 |
| WO | WO 91/02669 | 3/1991 |
| WO | WO 00/55015 | 9/2000 |

* cited by examiner

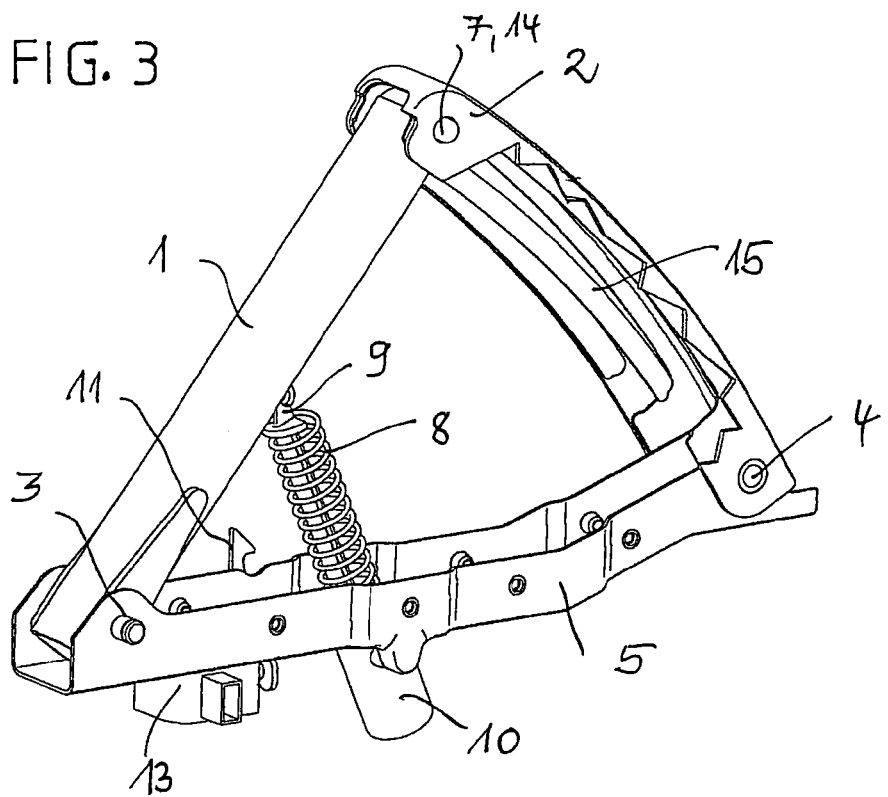
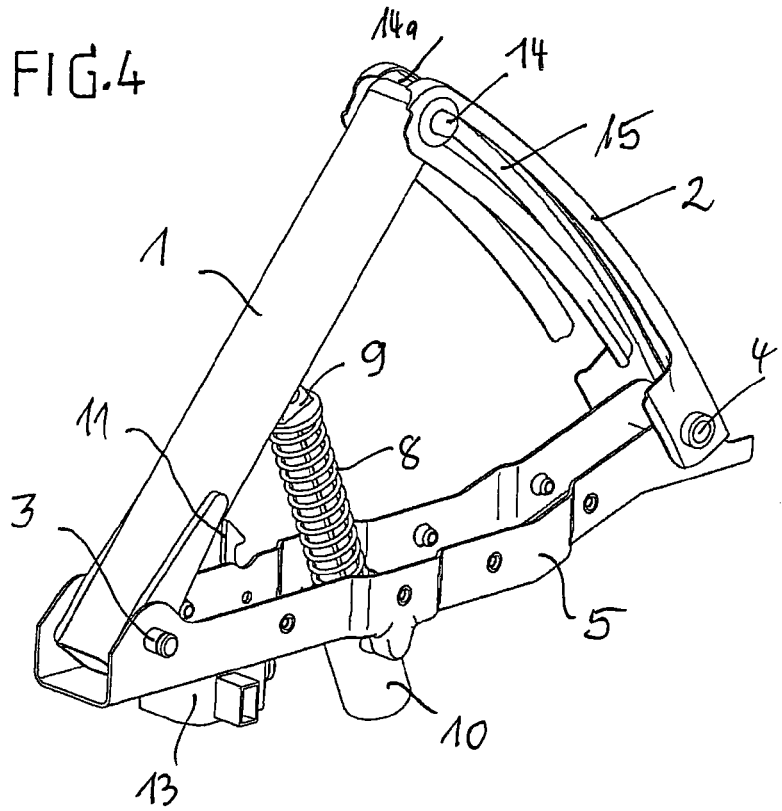

ROLLOVER PROTECTION SYSTEM WITH A FOLDING ROLL BAR FOR VEHICLES

FIELD OF THE INVENTION

The invention concerns a rollover protection system for vehicles, with roll bars allocated to the vehicle seats in a fixed manner, which roll bars are each contained in a bracket attached to the vehicle. Under normal conditions, each roll bar is contained by a holding device in a lower, stored rest position. Upon release of the holding device, controlled by a sensor, the roll bars are brought into an upright, protective position.

Rollover protection systems of this type serve to protect the occupants of vehicles lacking a protecting roof, typical of convertibles or sports vehicles, by creating a space for survival during a rollover.

BACKGROUND OF THE INVENTION

It is known in the art to provide a permanently installed roll bar that spans the entire width of the vehicle (EP 0 233 777), or to assign a permanently installed roll bar to each seat (DE 196 04 423). Both solutions rely upon a so-called fixed roll bar, that is, a roll bar that does not actively deploy when a rollover threatens, that is, a roll bar that does not deploy from a stored, rest position to an upright, support position. From the German patent DE 600 01 224 T2, it is known to equip a fixed roll bar, attached to the vehicle seat, with two support positions of differing heights: a somewhat lower position when the folding vehicle roof is closed and a raised position when the folding vehicle roof is open. This is achieved in each case by means of a folding roll bar having two frame supports, pin-jointed together, the free ends of the frame supports are each located on a horizontal threaded rod, are longitudinally slideable, and are connected with the vehicle roof adjustment.

In this known construction, there is no stored position for the roll bar as there is an active system; rather, it comprises a fixed, permanently deployed roll bar with two support positions of different heights. Spatial conditions do not allow for a stored position in this construction.

One finds ever increasing numbers of constructive designs for so-called active roll bars on the market. In the case of active roll bars, the roll bar is stored in the normal, stored position, and, in the case of danger, when threatened with a rollover, the sensor-controlled roll bar is quickly deployed into a protective position. This prevents the vehicle occupants from being crushed by the rolling vehicle.

These designs typically show, for each seat, a roll bar that is U-shaped or is formed by a structural section and is guided by a guide element that is permanently attached to the vehicle. The guide element is fixed in a cassette housing. The roll bar is held in a lower rest position against the pressure of an actuating coil spring by a holding device during normal operations. In the case of a rollover, upon release of the holding device, the sensor-controlled roll bar is brought into an upper, protective position by the spring tension, whereby a locking device is actively engaged that prevents the compression of the roll bar into the cassette housing.

The holding device in this type of design typically comprises a holding element mounted on the roll bar body. The holding element stands in a releasable, mechanical connection together with a tripping element in a sensor-controlled triggering system, which is typically formed by a release solenoid, the so-called crash solenoid, or by a pyrotechnical tripping element.

The locking device, also described as a retraction block, typically comprises a pivotably coupled, spring-biased locking pawl with tooth segments and fixed toothed bar, a locking pin or the like, whereby, according to the construction, a locking element is connected with the roll bar and the other elements fixed to the vehicle.

Such a cassette construction for a roll bar protection system with a linearly deploying roll bar and with a locking pawl in the locking device is disclosed, for example, in German Patent DE 100 40 642 C1.

Other constructions for deployable roll bars are known, for example, according to German Patent DE 39 25 513 A1, the so-called swing gate, which is attached to the seat and pivots along the vehicular longitudinal axis. Also, the pivoting bar, according to German Patent DE 37 32 562 C1, which spans the vehicle width, is stored flush with the upper edge of the vehicle body in the area behind the back seats, and in the case of danger, is highly pivotal around the vehicular lateral axis.

The German Patent DE 101 43 934 A1 discloses an actively folding or collapsible roll bar, comprised of a transverse yoke roll bar, which extends at least approximately cross-wise over the width of the vehicle, and two side elements. One end of each side element is attached to the transverse yoke and can be longitudinally displaced, and the other end, under tension from a coil spring, is pivotable and connected at the vehicle body.

When the transverse yoke roll bar is in the stored, normal position, the two side elements are housed, front to front axially one behind the other in the transverse yoke roll bar. During a crash, the two side elements are deployed by the two coil springs into the protective position by the unfolding or opening of the roll bar as a whole.

This known construction of a folding roll bar is not applicable for active roll bars that are attached to the vehicle seats. The pivoting side elements lie axially one behind the other in the stored position. Because their length determines the rollover direction, they have to have a predetermined length, whereby the length of both side elements together would exceed the width of a roll bar that is attached to a vehicle seat.

Further, the known construction of a folding roll bar using the three-part conception—two side elements and a transverse yoke—is relatively expensive.

SUMMARY OF THE INVENTION

The task which forms the basis for the invention is the design of a rollover protection system, comprised of a folding roll bar that is allocated to the vehicle seat, at a relatively low cost.

The solution for this task is solved, according to the invention, with a vehicle rollover protection system, in which roll bars are allocated to the vehicle seats, wherein each roll bar is guided in a guide element that is permanently fixed to the vehicle. Under normal conditions, the roll bar can be kept in a lower, stored position by a holding device, it can also be brought into an upright, protective position by releasing the holding device, which is sensor controlled. The rollover protection system is characterized thusly: each roll bar comprises two frame pieces, which are each spaced along the vehicular lateral axis with one end, pivotably connected in a mounting in the bracket, which is fixed to the vehicle, and with the free ends so connected that when folded, they slide against each other, and when deployed, they interlock against each other.

The invention thereby creates a rollover protection system, which remains folded up in the stored position, and during the threat of a rollover, deploys from the folded, stored position into an upright, locked position, whereby the frame pieces, which were folded together, deploy and interlock against each other in the upright position.

By means of the characteristics, according to the invention, it is possible to integrate an effective rollover protection system with a folding roll bar, even into vehicles that have very little passenger compartment space. This is particularly the case in those vehicles, where the space within the vehicle in the area of the backrest under the folding roll bar is needed for other purposes. This particularly applies, for example, where space for carrying capacity or for storing a convertible roof has to be available.

By this means, the possibility is also created for integrating additional stability-increasing components.

A further advantage is that the invention leads to a cost-effective rollover protection system, constructed out of few components, which decisively incorporates the cost pressures that prevail in the automotive industry, in particular among the suppliers to the industry.

The folding action can be different according to the shape of the frame pieces. When a monocoque construction is used, for example, the frame pieces lie on top of each other when folded together. If the frame pieces are flat, they can lie next to each other, and if the frame pieces have a tubular shape, they can traverse each other concentrically.

Further embodiments and additional designs of the invention are identified in the subclaims and result from the description of the figures.

BRIEF DESCRIPTION OF THE DRAWINGS

The invention will be described in more detail on the basis of one of the preferred exemplary embodiments represented in the patent figures in different views and positions.

As shown in the following figures:

FIG. 3 shows, in a cut out drawing from FIG. 1, the folding roll bar with a cut-away outer shell of the non-actuated frame piece;

FIG. 4 shows, in a drawing corresponding with FIG. 3, the folding roll bar, in accordance with the invention, with no outer shell on the non-actuated frame piece;

DETAILED DESCRIPTION OF THE INVENTION

Figure 1:
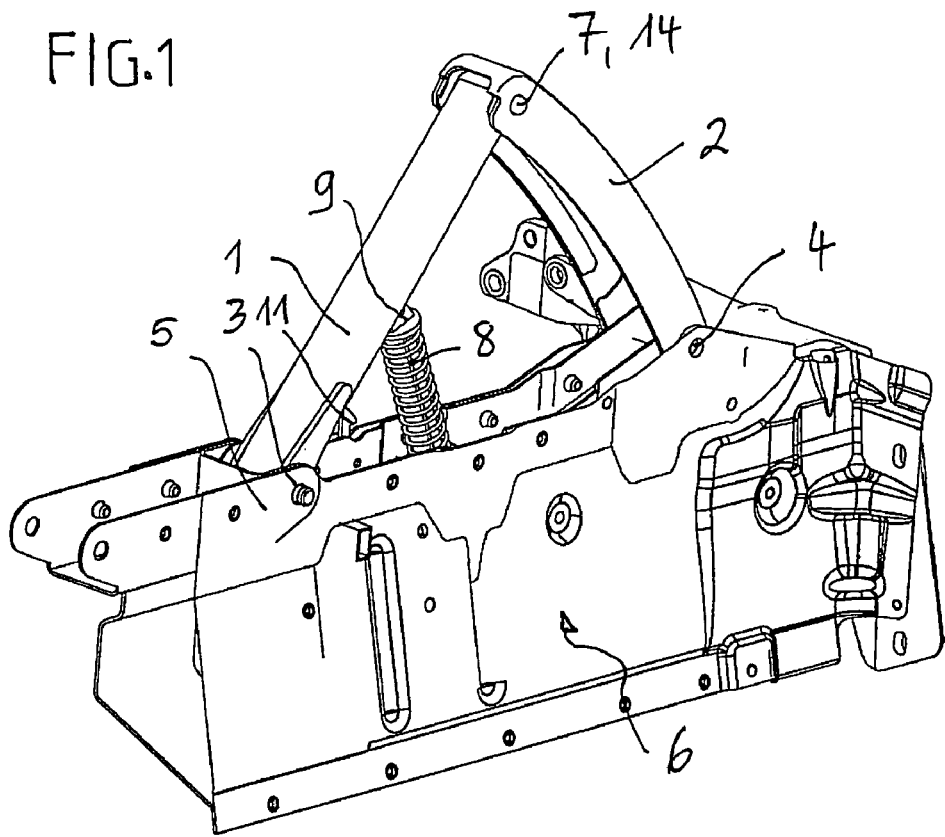
FIG. 1 shows, in an isometric drawing, the folding roll bar, according to the invention, constructed of two folding frame pieces, in the upright, locked position.

The figures show a folding roll bar, constructed according to the invention, as the roll bar body of a rollover protection system for vehicles, which roll bar body is allocated to the vehicle seat. This folding roll bar comprises two frame pieces 1 and 2 respectively, of which one end of each is pivotably connected in mounting 3 and 4 respectively, in a base frame 5 (FIG. 3 or 4) of a bracket 6, which is fixed to the vehicle frame. The bracket can be formed by a cassette construction or a section in a cross member of the rear panel of the rear seat. The other ends of the frame pieces, as will be illustrated, are pivotable and move together and are connected to each other.

In the represented exemplary embodiment, the frame pieces 1, 2, in connection with the base frame 5, are constructed using monocoque construction, so that the frame pieces can be folded into each other in a space-conserving fashion, and can be contained in the base frame 5. Other exemplary embodiments of the frame pieces are conceivable, using tubular construction or component geometry, which can be constructed with methods, which would allow for the construction of complex components.

The fixed mountings 3 and 4 respectively decrease the forces generated by a rollover and transfer them to the vehicle body. Therefore, they have to be correspondingly strongly dimensioned and fixed in the base frame 5.

For deploying the folding roll bar, an actuating pressure spring 8 in the form of a coil spring is provided. The coil spring, as FIG. 9 particularly shows, is connected with one end on a flange of spring guide bolt 9, which spring guide bolt is pivotably connected to frame piece 1, and which coil spring is supported with the other end in a bowl-shaped depression 10 of the base frame. The assembly can be so constructed, that an actuating spring is correspondingly assigned to both frame pieces 1, 2. In place of a pressure spring in the form of a coil spring, a spiral spring, a leg spring, or the equivalent may be provided.

Figure 2:
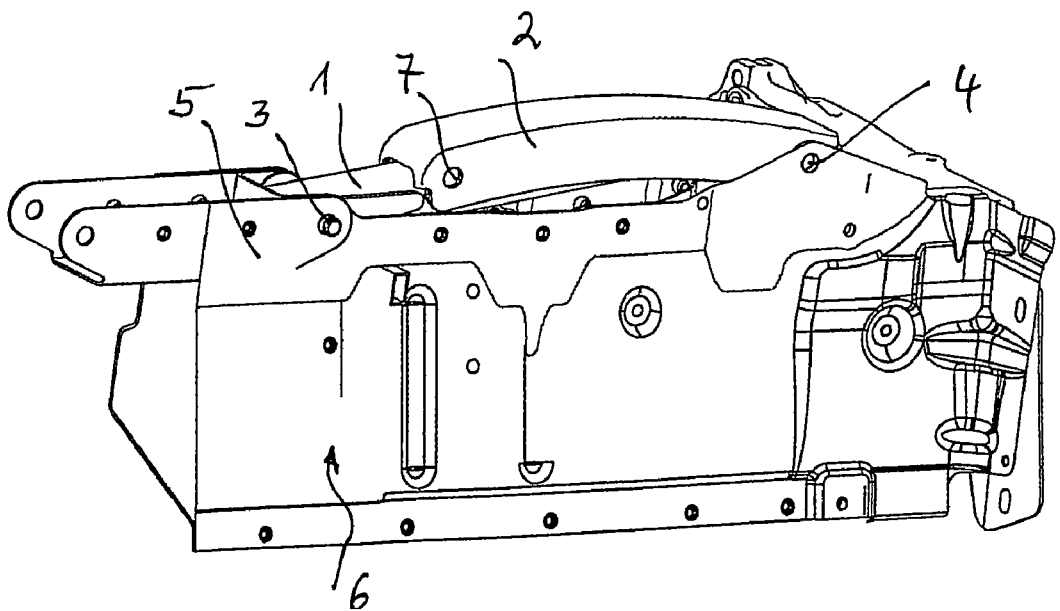
FIG. 2 shows, in an isometric drawing, the folding roll bar, according to the invention, in the folded, stored position.
Figure 5:
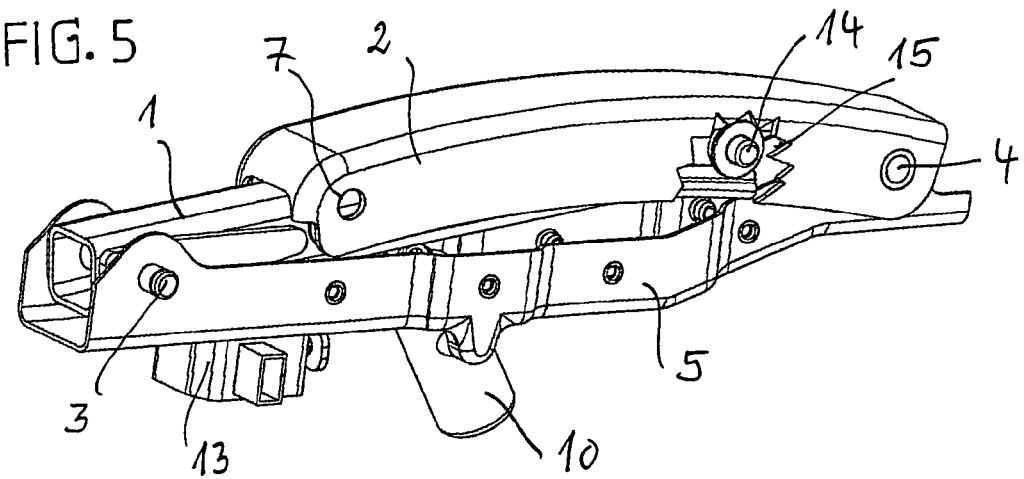
FIG. 5 shows, in an isometric cut-away drawing, the stored folding roll bar according to FIG. 2, with a partially broken away outer shell of the non-actuated frame piece in order to show the elements for locking the frame pieces in the upright position.
Figure 7:
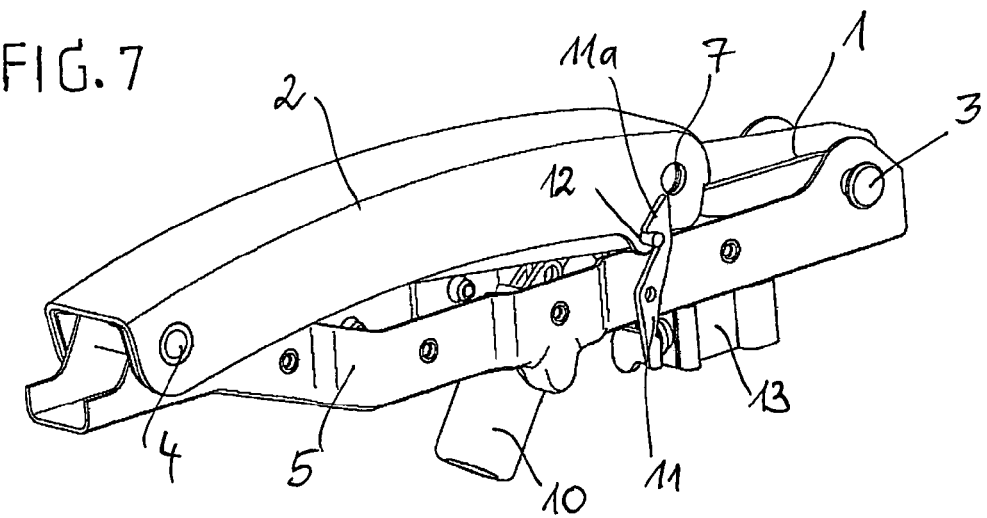
FIG. 7 shows a drawing according to FIG. 5, viewed from the back, in order to show the holding device for holding the folded frame pieces in the base position.

In the folded, that is, in the stored position of the folding roll bar (FIGS. 2, 7), the actuating pressure spring 8 is pretensioned. The folding roll bar is held in this position by a releasable holding device. A series of constructions are conceivable for this holding device, as these constructions have been made known, particularly by the relevant state of the art. In the represented exemplary embodiment, the holding device comprises, as FIG. 7 specifically shows, a pivotable (pretensioned) locking pawl 11, connected to the base frame 5, with a hook-shaped lever arm 11a, which arm functions in connection with a holding member, which holding member is formed by a locking pin 12, fixed on the non-actuating frame piece 2.

Figure 8:
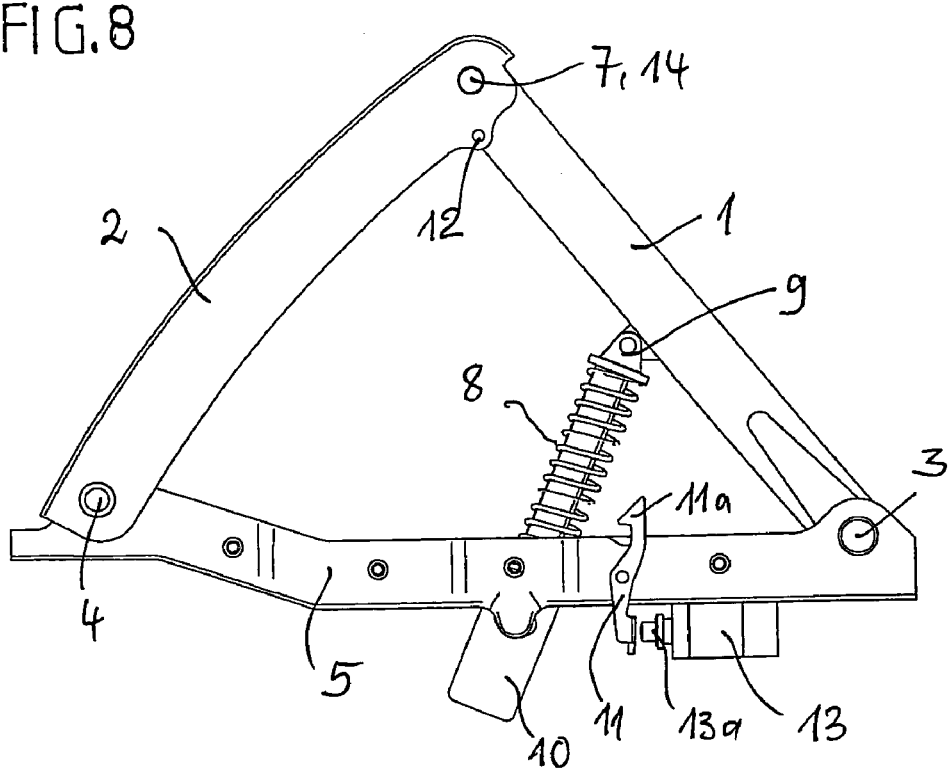
FIG. 8 shows, in a side view, the position of the folding roll bar and the holding device in the upright position.

The other lever arm of locking pawl 11 functions in connection with a trigger pin 13a of an actuator 13, which is fixed to the vehicle body and which can be formed by an electromagnetic or pyrotechnic actuator, as FIG. 8 specifically shows.

Figure 6:
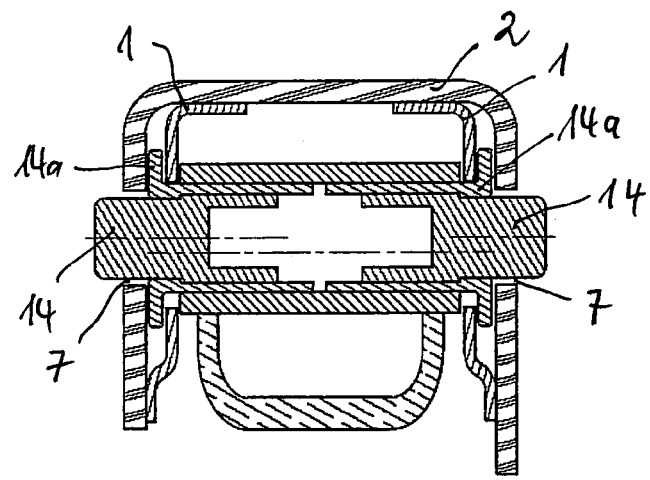
FIG. 6 shows a cross-sectional view of the frame pieces in the area of the locking element.
Figure 9:
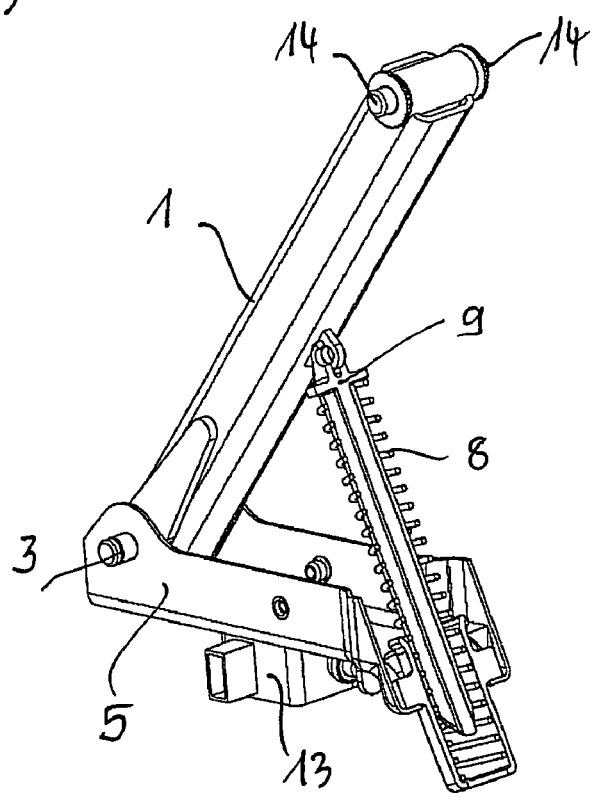
FIG. 9 shows, in an isometric cut-away drawing, the connection of an actuating coil spring with the corresponding frame piece.

When the actuator 13, which is controlled by a sensor, is activated by the threat of a rollover, the actuator thrusts out the trigger pin 13a, which trigger pin pivots the locking pawl 11, thereby releasing the locking pin 12. By this means, the actuating pressure spring 8 deploys the actuated frame piece 1, which frame piece pulls the non-actuating frame piece 2 upright with it. This "pulling up together" occurs due to the particular type of connection of both frame pieces 1, 2. As FIG. 9 shows, in connection with the cross-sectional view according to FIG. 6, on the front end of the actuating frame piece 1, two pins 14, maintained under spring loading, are located in guide bushing 14a. These pins are incorporated into a slotted piece 15 (FIG. 4), located inside the non-actuating frame piece 2, and are forced apart toward the outside by the spring loading. In the stored position, the pins are located at the lower end of the slotted piece in the non-actuating frame piece 2. When the actuating pressure spring 8 deploys the frame piece 1, the pins 14 bring the other frame piece 2 along via the slotted piece 15, until the upright position is achieved, see FIGS. 1, 3, 4, 8, and 9. In this upright position, the pins 14 engage into apertures 7 of the non-actuating frame piece 2.

In order that the deployed frame pieces can not be compressed by a rollover, they must be locked in the upright position (retraction block). The corresponding locking device is formed by the pins 14 on the one side and by the apertures 7 on the other.

It is understood, that, in principle, other known locking mechanisms, like, for example, a latch locking device, can be employed.

In the upright position, the two frame pieces 1, 2, together with the base frame 5, form a triangle. Due to this triangular configuration and the pivotable storing of the frame pieces, these function as compression struts and can, accordingly, transfer extremely high pressure forces into the vehicle structure.

It is operationally necessary, following an unintentional release of the roll bar or following a release for testing/inspection purposes, to unlock the system and to reverse the roll bar, that is, to bring it back into the storage position, typically against the force of the deployed actuating pressure spring. The reversing occurs by activating a reversing device, which means, the two pins 14 are pressed together against their tension, the pins thereby arrive out of the apertures 7 back into the slotted piece 15, and the frame pieces are guided against the force of the actuating pressure spring 8 and brought into the starting position. The locking pawl 11 engages on the holding pin 12 and the system is again ready for operation.

The actuating pressure spring can also be toggled without electrical power.

LIST OF REFERENCE NUMBERS 1. actuating frame piece
2. non-actuating frame piece
3. mounting (of the actuating frame piece)
4. mounting (of the non-actuating frame piece)
5. base frame
6. bracket fixed to the vehicle body
7. apertures
8. actuating pressure spring
9. spring guiding bolt
10. bowl-shaped appendage
11. locking pawl
11a. hook-shaped lever arm
12. locking pin
13. actuator
13a trigger pin
14. pins
14a guide bushing
15. slotted piece

The invention claimed is:

1. A rollover protection system for vehicles, comprising: roll bars that are adapted to be allocated to seats of the vehicle and are guided in a bracket that is itself adapted to be fixed to the vehicle, and under normal conditions the roll bars are held in a lower, stored position, controlled by a sensor, and are brought into an upright, protective position by releasing a holding device, wherein each roll bar comprises two frame pieces, which are each spaced in a vehicular lateral axis, with one end pivotably connected in a mounting located in the bracket adapted to be fixed to the vehicle, and wherein free ends so connected that when folded, the free ends slide against each other, and when deployed, the free ends interlock against each other.

2. The rollover protection system according to claim 1, wherein the two frame pieces can be folded into each other when a monocoque construction is used.

3. The rollover protection system according to claim 1, wherein the bracket comprises a trough-shaped base frame on a top of the bracket, into which the mountings for the frame pieces are located, and which contains the frame pieces when they are folded together.

4. The rollover protection system according to claim 1, wherein an actuating spring is provided for deploying the frame pieces.

5. The rollover protection system according to claim 4, wherein the actuating spring comprises a coil spring.

6. The rollover protection system according to claim 5, wherein the actuating coil spring is assigned to only one of the frame pieces.

7. The rollover protection system according to claim 6, wherein the actuating coil spring comprises a spring guide bolt, which spring guide bolt is pivotably connected to frame piece, and a flanged, radial appendage for bracing one end of the actuating coil spring, whereby a supporting point fixed to the vehicle frame is provided for bracing the other end of the actuating coil spring.

8. The rollover protection system according to claim 1, wherein the holding device comprises a pivotable locking pawl connected to the bracket that is fixed to the vehicle frame, wherein the locking pawl is connected with a holding element located on one of the frame pieces, and is provided with an actuator that functions together with the locking pawl in a triggering function.

9. The rollover protection system according to claim 1, wherein the free end of the frame piece comprises two opposing pins, which slide and are located in a slotted guide piece, which slotted piece is located in the other frame piece.

10. The rollover protection system according to claim 9, wherein the pins are placed under spring tension, and the frame piece, in which the slotted guide piece is located, possesses two opposing apertures in the head end, which apertures form the locking receptacle for the pins in the upright position of the frame pieces.

11. The rollover protection system according to claim 2, wherein the bracket comprises a trough-shaped base frame on a top of the bracket, into which the mountings for the frame pieces are located, and which contains the frame pieces when they are folded together.

12. The rollover protection system according to claim 11, wherein an actuating spring is provided for deploying the frame pieces.

13. The rollover protection system according to claim 12, wherein the actuating spring comprises a coil spring.

14. The rollover protection system according to claim 13, wherein the actuating coil spring is assigned to only one of the frame pieces.

15. The rollover protection system according to claim 14, wherein the actuating coil spring comprises a spring guide bolt, which spring guide bolt is pivotably connected to frame piece, and a flanged, radial appendage for bracing one end of the actuating coil spring, whereby a supporting point fixed to the vehicle frame is provided for bracing the other end of the actuating coil spring.

16. The rollover protection system according to claim 15, wherein the holding device comprises a pivotable locking pawl connected to the bracket that is fixed to the vehicle frame, wherein the locking pawl is connected with a holding element located on one of the frame pieces, and is provided with an actuator that functions together with the locking pawl in a triggering function.

17. The rollover protection system according to claim 16, wherein the free end of the frame piece comprises two opposing pins, which slide and are located in a slotted guide piece, which slotted piece is located in the other frame piece.

18. The rollover protection system according to claim 17, wherein the pins are placed under spring tension, and the frame piece, in which the slotted guide piece is located, possesses two opposing apertures in the head end, which apertures form the locking receptacle for the pins in the upright position of the frame pieces.

* * * * *